United States Patent
Karikari et al.

(10) Patent No.: US 10,590,249 B2
(45) Date of Patent: Mar. 17, 2020

(54) WATER-SOLUBLE FILMS AND THEIR USE IN DETERGENT PACKETS

(71) Applicant: Rohm and Haas Company, Collegeville, PA (US)

(72) Inventors: Afua Sarpong Karikari, Bristol, PA (US); Michael Mitchell, King Prussia, PA (US); Fanwen Zeng, Audubon, PA (US)

(73) Assignee: Rohm and Haas Company, Philadelphia, PA (US)

( * ) Notice: Subject to any disclaimer, the term of this patent is extended or adjusted under 35 U.S.C. 154(b) by 29 days.

(21) Appl. No.: 15/744,901

(22) PCT Filed: Aug. 24, 2016

(86) PCT No.: PCT/US2016/048259
§ 371 (c)(1),
(2) Date: Jan. 15, 2018

(87) PCT Pub. No.: WO2017/058405
PCT Pub. Date: Apr. 6, 2017

(65) Prior Publication Data
US 2018/0208727 A1    Jul. 26, 2018

Related U.S. Application Data

(60) Provisional application No. 62/234,170, filed on Sep. 29, 2015.

(51) Int. Cl.
| | | |
|---|---|---|
| C11D 17/04 | (2006.01) | |
| C11D 3/37 | (2006.01) | |
| C08L 33/06 | (2006.01) | |
| C08J 5/18 | (2006.01) | |
| B65D 65/46 | (2006.01) | |
| C09J 133/06 | (2006.01) | |

(52) U.S. Cl.
CPC .............. C08J 5/18 (2013.01); C08L 33/06 (2013.01); C09J 133/06 (2013.01); C11D 3/3761 (2013.01); C11D 17/042 (2013.01); C08J 2333/12 (2013.01); C08J 2433/08 (2013.01); C08L 2205/02 (2013.01)

(58) Field of Classification Search
None
See application file for complete search history.

(56) References Cited

U.S. PATENT DOCUMENTS

| | | | |
|---|---|---|---|
| 3,245,932 A | 4/1966 | Glavis et al. | |
| 3,453,245 A | 7/1969 | Glavis et al. | |
| 4,196,190 A | 4/1980 | Gehman et al. | |
| 5,631,317 A | 5/1997 | Komatsu et al. | |
| 6,291,372 B1 | 9/2001 | Mumick et al. | |
| 6,683,129 B1 | 1/2004 | Eknoian | |
| 6,943,200 B1 | 9/2005 | Corrand et al. | |
| 7,642,226 B2 | 1/2010 | Verrall et al. | |
| 7,772,138 B2 | 8/2010 | Lostocco et al. | |
| 8,232,345 B2 | 7/2012 | Farwaha et al. | |
| 8,865,638 B2 | 10/2014 | Adamy | |
| 2005/0205574 A1* | 9/2005 | Lambotte | C11D 17/0039 220/234 |
| 2013/0065811 A1* | 3/2013 | Fernandez-Prieto | C11D 3/32 510/375 |
| 2013/0206638 A1* | 8/2013 | Wong | C11D 3/046 206/524.7 |
| 2015/0147502 A1* | 5/2015 | Lindenmuth | C08L 23/02 428/35.7 |
| 2016/0040338 A1 | 2/2016 | Berezin et al. | |
| 2016/0244701 A1* | 8/2016 | Backer | C08L 23/0869 |

FOREIGN PATENT DOCUMENTS

| | | |
|---|---|---|
| JP | 04488731 | 6/2010 |
| WO | 9700282 | 1/1997 |
| WO | 9821118 | 5/1998 |
| WO | 2008087964 | 7/2008 |

* cited by examiner

Primary Examiner — Lorna M Douyon

(57) ABSTRACT

Provided is a water soluble film, and detergent packets comprising the film as an encasing material. The film contains a (meth)acrylic polymer that is a blend of a hard polymer and a soft polymer, and a plasticizer.

8 Claims, No Drawings ered safety as a result of a reduction in exposure to chemicals present in cleaning formulations. Much of the art of packaging unit dose detergents relates to the development of the water-soluble film package. Presently, the pouch or package containing the liquid laundry detergent is predominantly based on partially hydrolyzed polyvinyl alcohol homopolymers, PVOH, and its copolymers.

WATER-SOLUBLE FILMS AND THEIR USE IN DETERGENT PACKETS

FIELD

This invention relates generally to a water soluble film containing a (meth)acrylic polymer that is a blend of a hard polymer and a soft polymer, and to detergent packets containing the water soluble film as an encasing material.

BACKGROUND

Water-soluble films are useful in many applications. In the household and industrial markets, the use of water-soluble films in detergent packets, such as unit dose delivery systems, provides several benefits for consumers including ease and convenience of use, low cost, and increased safety as a result of a reduction in exposure to chemicals present in cleaning formulations. Much of the art of packaging unit dose detergents relates to the development of the water-soluble film package. Presently, the pouch or package containing the liquid laundry detergent is predominantly based on partially hydrolyzed polyvinyl alcohol homopolymers, PVOH, and its copolymers.

Liquid laundry detergent compositions are usually formulated with high water content, e.g., of about 70 to 90 wt % of water. High water content provides several advantages, including faster delivery and dispersibility of the formulation ingredients. However, PVOH based polymers are unsuitable for packaging liquid laundry detergent compositions with water content greater than 15-20%. Higher water content will destroy the structural integrity of the water soluble pouch due to plasticization and premature dissolution and breakdown of the film.

Current unit dose liquid laundry detergents packaged in PVOH-based water dispersible pouch or packets are therefore highly concentrated heavy-duty liquid formulations with low levels of water content. In these formulations, the water content is typically limited to about 10 wt % to ensure compatibility of the liquid detergent with the water dispersible pouch and prevent premature dissolution and breakdown of the pouch. Because of the low water content, liquid unit dose systems require higher amounts of organic solvents compared to their liquid laundry detergents counterparts. These solvents unfortunately add cost to the detergent formulation without providing any additional cleaning benefit.

The problem addressed by this invention is the provision of water-soluble films and packets or pouches for liquid laundry formulations that contain high water content, for instance, of 20% by weight or more.

STATEMENT OF INVENTION

We have now found that water soluble films, prepared from a blend of acrylic polymers with specified glass transition temperatures as described here, exhibit various desirable properties, including stability in high ionic strength aqueous solutions, and the ability to readily dissolve when the ionic strength is reduced. Advantageously, these properties render the films suitable as encasing packages for detergent packets (e.g., unit dose delivery systems) containing detergent formulations with high water content (e.g., 20 to 75 wt % water), salts (e.g., 3 to 25 wt % salts), and surfactants.

Accordingly, in one aspect, there is provided a water soluble film. The water soluble film comprises:

(A) an acrylic polymer blend comprising:

(a) a hard polymer with a glass transition temperature ("Tg") from 60° C. to 130° C. and comprising polymerized units derived from: (i) 50 to 90 wt % of at least one (C1-C10)alkyl (meth)acrylate; (ii) 10 to 50 wt % of at least one C3-C8 monoethylenically unsaturated monocarboxylic acid monomer or ethylenically unsaturated dicarboxylic acid monomer; and (iii) zero to 25 wt % of least one hydroxyalkyl (meth)acrylate, based on the total weight of the hard polymer; and (b) a soft polymer with a Tg from minus 20° C. to 40° C. and comprising polymerized units derived from: (i) 50 to 90 wt % of at least one (C1-C10)alkyl (meth)acrylate; (ii) 10 to 50 wt % of at least one C3-C8 monoethylenically unsaturated monocarboxylic acid monomer or ethylenically unsaturated dicarboxylic acid monomer; and (iii) zero to 25 wt % of least one hydroxyalkyl (meth)acrylate, based on the total weight of the soft polymer, wherein the difference in the Tgs of the hard polymer and the soft polymer is 40° C. or more, and wherein at least a portion of the carboxylic acid groups on the hard polymer or the soft polymer, or both the hard polymer and the soft polymer, are neutralized; and (B) a plasticizer.

In another aspect, there is provided a detergent packet. The detergent packet comprises: (a) a detergent formulation comprising from 14 to 40 wt % surfactants; from 3 to 25 wt % salts; and from 20 to 75 wt % water; and (b) a package encasing the detergent formulation, wherein the package comprises a water soluble film as described herein.

DETAILED DESCRIPTION

Unless otherwise indicated, numeric ranges, for instance as in "from 2 to 10," are inclusive of the numbers defining the range (e.g., 2 and 10). Unless otherwise indicated, ratios, percentages, parts, and the like are by weight. As used herein, unless otherwise indicated, the phrase "molecular weight" or Mw refers to the weight average molecular weight as measured in a conventional manner with gel permeation chromatography (GPC) and polyacrylic acid standards. GPC techniques are discussed in detail in Modern Size Exclusion Chromatography, W. W. Yau, J. J. Kirkland, D. D. Bly; Wiley-Interscience, 1979, and in A Guide to Materials Characterization and Chemical Analysis, J. P. Sibilia; VCH, 1988, p. 81-84. Molecular weights are reported herein in units of Daltons. The term "ethylenically unsaturated" is used to describe a molecule or moiety having one or more carbon-carbon double bonds, which renders it polymerizable. "Polymer" refers to a polymeric compound prepared by polymerizing monomers, whether of the same or a different type. The generic term "polymer" includes the terms "homopolymer," "copolymer," and "terpolymer." The term "polymerized units derived from" refers to polymer molecules that are synthesized according to polymerization techniques wherein a product polymer contains "polymerized units derived from" the constituent monomers which are the starting materials for the polymerization reactions. As used herein the term "(meth)acrylic" refers to acrylic or methacrylic and "(meth)acrylate" refers to either acrylate or methacrylate. Weight percentages (or wt %) in the composition are percentages of dry or actives weight, i.e., excluding any water that may be present in the composition. Percentages of monomer units in the polymer are percentages of solids or neat monomer weight, i.e., excluding any water present in a polymer emulsion, and are based on the total weight of the polymer (determined from the total weight of the monomers from which the polymer is comprised).

For purposes of this invention, the term "hard polymer" and "soft polymer" each independently include mixtures of polymers.

"Glass transition temperature" or "$T_g$" refers to the temperature at or above which a glassy polymer will undergo segmental motion of the polymer chain. Glass transition temperatures of a polymer can be estimated by the Fox equation (*Bulletin of the American Physical Society,* 1 (3) Page 123 (1956)) as follows:

$$1/T_g = w_1/T_{g(1)} + w_2/T_{g(2)}$$

For a copolymer, $w_1$ and $w_2$ refer to the weight fraction of the two comonomers, and $T_{g(1)}$ and $T_{g(2)}$ refer to the glass transition temperatures of the two corresponding homopolymers made from the monomers. For polymers containing three or more monomers, additional terms are added ($w_n/T_{g(n)}$). The $T_{(g)}$ of a polymer can also be calculated by using appropriate values for the glass transition temperatures of homopolymers, which may be found, for example, in "Polymer Handbook," edited by J. Brandrup and E. H. Immergut, Interscience Publishers. The $T_g$ of a polymer can also be measured by various techniques, including, for example, differential scanning calorimetry ("DSC"). The values of $T_g$ reported herein are measured by DSC.

As indicated above, in one aspect, the invention provides a water soluble film comprised of: (A) an acrylic polymer blend containing (a) a hard polymer and (b) a soft polymer; and (B) a plasticizer.

The hard polymer of the blend is a material with a glass transition temperature from 60° C. to 130° C. In some embodiments, the Tg of the hard polymer is from 70 to 100° C., alternatively from 75 to 85° C. The hard polymer comprises polymerized units derived from: (i) 50 to 90 wt % of at least one (C1-C10)alkyl (meth)acrylate; (ii) 10 to 50 wt % of at least one C3-C8 monoethylenically unsaturated monocarboxylic acid monomer or ethylenically (preferably monoethylenically) unsaturated dicarboxylic acid monomer; and (iii) zero to 25 wt % of least one hydroxyalkyl (meth) acrylate, based on the total weight of the hard polymer.

The (C1-C10)alkyl (meth)acrylate of the hard polymer may be linear or branched. The amount of the (C1-C10)alkyl (meth)acrylate ranges from 50 to 90 wt %, preferably from 75 to 85 wt %, based on the total weight of the hard polymer. Preferably, the (C1-C10)alkyl (meth)acrylate is selected from one or more of (C1 C8)alkyl (meth)acrylates such as, for example, methyl (meth)acrylate, ethyl (meth)acrylate, propyl (meth)acrylate, butyl (meth)acrylate, pentyl (meth) acrylate, and 2-ethylhexyl (meth)acrylate. Preferably, in the hard polymer, the (C1-C10)alkyl (meth)acrylate component comprises at least one (C1-C3)alkyl methacrylate and at least one (C2-C8)alkyl acrylate. Most preferably the alkyl (meth)acrylate component comprises methyl methacrylate, butyl acrylate, and 2-ethylhexyl acrylate. The amount of the at least one (C1-C3)alkyl methacrylate in the hard polymer is preferably from 30 to 60 wt %, preferably from 43 to 53 wt %, based on the total weight of the hard polymer. The amount of (C2-C8)alkyl acrylate is preferably from 20 to 50 wt % and more preferably from 30 to 40%, based on the total weight of the hard polymer.

The C3-C8 monoethylenically unsaturated monocarboxylic acid monomer or the ethylenically unsaturated dicarboxylic acid monomer of the hard polymer is preferably selected from one or more of (meth)acrylic acid, crotonic acid, itaconic acid (or its anhydride), and maleic acid (or its anhydride). More preferably, the monomer is methacrylic acid. The combined amount of the unsaturated monocarboxylic and unsaturated dicarboxylic acid monomer in the hard polymer is from 10 to 50 wt %, preferably from 12 to 25 wt %, based on the total weight of the hard polymer.

The alkyl group of the hydroxyalkyl (meth)acrylate component, optionally present in the hard polymer, is preferably a (C1 C5)alkyl group. For example, the hydroxyalkyl (meth) acrylate, when present, is preferably selected from one or more of hydroxyethyl (meth)acrylate, hydroxypropyl (meth) acrylate, hydroxybutyl (meth)acrylate and hydroxypentyl (meth)acrylate. More preferably the hydroxyalkyl (meth) acrylate is selected from one or more of hydroxyethyl methacrylate and hydroxypropyl acrylate. Still more preferably, the hydroxyalkyl (meth)acrylate is 2-hydroxyethyl methacrylate. The amount of the hydroxyalkyl (meth)acrylate in the hard polymer is from zero to 25 wt %, preferably zero to 10 wt %. In some embodiments, the amount is zero.

In some embodiments, the hard polymer comprises polymerized units derived from: (i) 70 to 90 wt %, preferably 75 to 85 wt %, of methyl methacrylate, butyl acrylate, and 2-ethylhexyl acrylate; and (ii) 10 to 30 wt %, preferably 15 to 25 wt %, of methacrylic acid, based on the total weight of the hard polymer.

In some embodiments, the hard polymer has a weight average molecular weight from 40,000 to 150,000, preferably from 40,000 to 90,000.

In some embodiments, the water soluble film contains from 30 to 70 wt %, preferably from 40 to 60 wt %, of the hard polymer, based on the total weight of the film.

The soft polymer of the blend is a material with a glass transition temperature from minus 20° C. to 40° C. In some embodiments, the Tg of the soft polymer is from 5 to 35° C., alternatively from 10 to 30° C. The soft polymer comprises polymerized units derived from: (i) 50 to 90 wt % of at least one (C1-C10)alkyl (meth)acrylate; (ii) 10 to 50 wt % of at least one C3-C8 monoethylenically unsaturated monocarboxylic acid monomer or ethylenically (preferably monoethylenically) unsaturated dicarboxylic acid monomer; and (iii) zero to 25 wt % of least one hydroxyalkyl (meth) acrylate, based on the total weight of the soft polymer The (C1-C10)alkyl (meth)acrylate of the soft polymer may be linear or branched. The amount of the (C1-C10)alkyl (meth)acrylate ranges from 50 to 90 wt %, preferably from 60 to 80 wt %, based on the total weight of the soft polymer. Preferably, the (C1-C10)alkyl (meth)acrylate is selected from one or more of (C2-C8)alkyl (meth)acrylates such as, for example, ethyl (meth)acrylate, propyl (meth)acrylate, butyl (meth)acrylate, pentyl (meth)acrylate, and 2-ethylhexyl (meth)acrylate. Preferably, in the soft polymer, the (C1-C10)alkyl (meth)acrylate component comprises one or more (C2-C8)alkyl acrylates, such as ethyl acrylate, butyl acrylate, and/or 2-ethylhexyl acrylate. Most preferably the (C2-C8)alkyl acrylates comprises a mixture of ethyl acrylate and butyl acrylate, or a mixture of ethyl acrylate, butyl acrylate, and 2-ethylhexyl acrylate.

The C3-C8 monoethylenically unsaturated monocarboxylic acid monomer or the ethylenically unsaturated dicarboxylic acid monomer of the soft polymer is preferably selected from one or more of (meth)acrylic acid, crotonic acid, itaconic acid (or its anhydride), and maleic acid (or its anhydride). More preferably, the monomer is methacrylic acid. The combined amount of the unsaturated monocarboxylic and unsaturated dicarboxylic acid monomer in the soft polymer is from 10 to 50 wt %, preferably from 12 to 30 wt %, based on the total weight of the soft polymer.

The alkyl group of the hydroxyalkyl (meth)acrylate component, optionally present in the soft polymer, is preferably a (C1 C5)alkyl group. For example, the hydroxyalkyl (meth) acrylate, when present, is preferably selected from one or more of hydroxyethyl (meth)acrylate, hydroxypropyl (meth) acrylate, hydroxybutyl (meth)acrylate and hydroxypentyl (meth)acrylate. More preferably the hydroxyalkyl (meth) acrylate is selected from one or more of hydroxyethyl methacrylate and hydroxypropyl acrylate. Still more preferably, the hydroxyalkyl (meth)acrylate is 2-hydroxyethyl methacrylate. The amount of the hydroxyalkyl (meth)acrylate in the soft polymer is from zero to 25 wt %, preferably zero to 10 wt %. In some embodiments, the amount is zero. In some embodiments, the amount is from zero to 20 wt %, alternatively from 10 to 20 wt %, based on the total weight of the soft polymer.

In some embodiments, the soft polymer comprises polymerized units derived from: (i) 55 to 90 wt %, preferably 60 to 90 wt %, of ethyl acrylate, butyl acrylate, and optionally 2-ethylhexyl acrylate; (ii) 10 to 45 wt %, preferably 10 to 40 wt %, of methacrylic acid; and (iii) zero to 25 wt %, preferably zero to 20 wt %, of 2-hydroxyethyl methacrylate, based on the total weight of the soft polymer.

In some embodiments, the soft polymer has a weight average molecular weight from 40,000 to 150,000, preferably from 40,000 to 90,000.

In some embodiments, the water soluble film contains from 15 to 45 wt %, preferably from 20 to 40 wt %, of the soft polymer, based on the total weight of the film.

The combination of a hard (higher Tg) and soft (lower Tg) polymer, according to the invention, has been found to provide a material with properties that are desirable for packaging detergents. To achieve the desirable properties, the difference in the Tgs of the hard polymer and the soft polymer is at least 40° C. In some embodiments, the difference is in the Tgs of the hard polymer and the soft polymer is 50° C. or more.

While not wishing to be bound by theory, it is believed that the (C1-C3)alkyl methacrylate component, for instance methyl methacrylate, provides hardness to polymers. Thus, the proportion of (C1-C3)alkyl methacrylate found in the polymer may be selected to provide the desired Tg: less (or none) in the soft polymer, and more in the hard polymer.

The hard and soft polymers of the invention may be prepared by conventional methods well known to those skilled in the art. The polymers are preferably prepared by emulsion polymerization, more preferably by a continuous in-line emulsification process. U.S. Pat. Nos. 3,245,932, 3,453,245 and 4,196,190 may be consulted for further general and specific details on suitable emulsion polymerization methods. Emulsifiers used in the polymer preparation keep the polymer suspended in the emulsion. Typical emulsifiers used to prepare the polymers include, for example, one or more of (C8-C18) alcohol sulfates (such as sodium lauryl sulfate and sodium tridecylether sulfate), diester sulfosuccinates, phosphoric acid esters (such as long-chain alkyloxypoly(alkyleneoxide), long-chain alkylaryloxypoly(alkyleneoxide), long-chain alkyl and long-chain alkylaryl mono- and di-esters of phosphoric acid, for example (C8 C18)alkylaryloxypoly(alkyleneoxide), (C10 C18)alkyloxypoly(alkyleneoxide), (C10-C18)alkyl, and (C8-C18)alkylaryl mono- and di-esters of phosphoric acid), alkaryl sulfonates, alkyl or aryl polyether sulfonates, alkyl or aryl polyether alcohols, ethylene oxide condensates of propylene oxide and propylene glycol adducts. Preferably, the emulsifiers used are anionic type emulsifiers, such as long-chain alkyloxypoly(alkyleneoxide), long-chain alkylaryloxypoly(alkyleneoxide), long-chain alkyl and long-chain alkylaryl mono- and di-esters of phosphoric acid.

In the invention, at least a portion of the carboxylic acid groups on the hard polymer or the soft polymer, or both the hard polymer and the soft polymer, are neutralized. The carboxylic acids may be neutralized by conventional techniques with at least one base. Bases that will neutralize the polymers may be selected from one or more amines, alkali or alkaline earth metal hydroxides, and ammonium hydroxide. Suitable amine neutralizers include, for example, 2 amino-2-methyl-1,3-propanediol, 2-amino-2-methyl-1-propanol, N,N-dimethyl-2-amino-2-methyl-1-propanol, monoisopropanolamine, triisopropanolamine, ethanolamine, triethanolamine and morpholine. Suitable alkali or alkaline earth metal hydroxides include, for example, sodium hydroxide and potassium hydroxide. Preferably, the neutralizer is selected from potassium hydroxide, sodium hydroxide, or mixtures thereof.

The amount of neutralizer added to the polymer is that amount needed to provide the desired level of neutralization. Typically from 5 to 100%, preferably from 10 to 100%, more preferably from 50 to 100%, and most preferably from 75 to 100%, based on molar equivalents, of the acid groups in the acrylic polymer blend are neutralized.

In some embodiments, the degree of neutralization may be between about 70 percent and about 95 percent, preferably between about 85 percent and about 95 percent, more preferably between about 90 percent and about 95 percent. A portion or all of the remaining carboxylic acids may be ionically crosslinked. It has been found that ionic crosslinking of the polymer results in improved water resistance and stability with high water detergents. Suitable crosslinking agents may include, for example, divalent cations, such as $Ca^{2+}$, $Mg^{2+}$, $Al^{3+}$, or $Zn^{2+}$. Preferred are $Ca^{2+}$ and $Zn^{2+}$, which may be provided, for example, by $CaCl_2$, ZnO, or soluble zinc complex (e.g., zinc ammonium bicarbonate). Preferably, the crosslinker, when present, is present in amount of at least 0.1 wt %, alternatively at least 0.2 wt %, or alternatively at least 0.3 wt %; and up to 5 wt %, alternatively up to 3 wt %, alternatively up to 1 wt %, based on the total weight of the water soluble film.

In some embodiments, it is preferred that the hard and soft polymers of the invention contain limited crystalline content (i.e., they are highly amorphous). More preferably, the polymers are completely amorphous with no crystallizable content. Percent crystallinity may be determined using differential scanning calorimetry. Percent crystallinity may be calculated by normalizing the heat of fusion of each sample to the known heat of fusion of a 100% crystalline reference standard. Preferably, the percent crystallinity of the hard and soft polymers is 5.0 percent or less, more preferably 1.0 percent or less. Further preferably, the percent crystallinity is zero.

The water soluble films of the invention contain a plasticizer. The plasticizer may be hydrophilic or hydrophobic, although hydrophilic plasticizers may result in a slight increase in overall film disintegration time. Thus, in some embodiments, it is preferred that a mixture of hydrophobic and hydrophilic plasticizers be used. Such mixtures provide the right balance of improved film formation and fast film break and disintegration. Examples of suitable hydrophobic plasticizers include benzoate esters, such as C9-11 branched alkyl esters of benzoic acid, and dibenzoate capped diethylene glycol. Examples of suitable hydrophilic plasticizers include glycerol, sorbitol, propylene glycol, polyols, and polyethylene glycol (e.g., PEG200 or PEG400). The plasticizer may be present in the water soluble film in an amount ranging from 1 to 30 wt %, preferably from 1 to 20 wt %, based on the total weight of the water soluble film.

The water soluble films of the invention may contain other optional ingredients including, but not limited to, tackifiers (e.g., rosin esters), crosslinkers (e.g., $CaCl_2$, ZnO), fillers (e.g., zinc stearate, colloidal silica particles, also referred to as silica sols herein, which can be produced from different raw materials, for example from precipitated silica, micro silica (silica fume), pyrogenic silica (fumed silica) or silica gels, and they may be silanised), or coalescents (e.g., dipropylene glycol methyl ether, a film forming aid).

In a preferred embodiment, the water soluble film of the invention comprises:
(A) an acrylic polymer blend comprising:
  (a) from 30 to 70 wt %, based on the total weight of the water soluble film, of a hard polymer with a glass transition temperature ("Tg") from 60° C. to 130° C. (preferably 70 to 90° C.) and comprising polymerized units derived from: (i) 50 to 90 wt % (preferably 75 to 90 wt %) of butyl acrylate, 2-ethylhexyl acrylate, and methyl methacrylate; and (ii) 10 to 50 wt % (preferably 10 to 25 wt %) of methacrylic acid, based on the total weight of the hard polymer; and
  (b) from 15 to 45 wt %, based on the total weight of the water soluble film, of a soft polymer with a Tg from minus 20° C. to 40° C. (preferably 10 to 30° C.) and comprising polymerized units derived from: (i) 50 to 90 wt % (preferably 60 to 90 wt %) of butyl acrylate, ethyl acrylate, and optionally 2-ethylhexyl acrylate; (ii) 10 to 50 wt % (preferably 10 to 40 wt %) of methacrylic acid; and (iii) zero to 20 wt % of 2-hydroxyethyl methacrylate, based on the total weight of the soft polymer,
  wherein the difference in the Tgs of the hard polymer and the soft polymer is 40° C. or more, and wherein at least a portion of the carboxylic acid groups on the hard polymer or the soft polymer, or both the hard polymer and the soft polymer, are neutralized; and
(B) from 1 to 30 wt %, based on the total weight of the water soluble film, of a plasticizer that is a mixture of a hydrophobic plasticizer and a hydrophilic plasticizer;
(C) from 0 to 5 wt % (preferably 0.1 to 3 wt %), based on the total weight of the water soluble film, of a divalent metal ion crosslinker (e.g., ZnO or $CaCl_2$); and
(D) from 0 to 15 wt % (preferably from 1 to 10 wt %), based on the total weight of the water soluble film, of a filler (e.g., silica or fumed silica).

Water soluble films of the invention may be prepared by techniques known to those skilled in the art including, for example, via solution casting on a substrate, such as glass. Typically, water is used as the solvent for the solution casting, although other solvents may be used. Following casting, the films may be dried heating at elevated temperature, for instance 65-80° C.

In another aspect, the invention provides a detergent packet, such as a unit dose packet, utilizing the water soluble films described above. The detergent component of the packet is typically a high ionic strength material, contain salts at a concentration of at least 3 wt %. Advantageously, the detergent may hold larger amounts of water than would be possible with conventional PVOH based packets.

Thus, the detergent packet according to this aspect of the invention comprises: (a) a detergent formulation comprising from 14 to 40 wt % surfactants; from 3 to 25 wt % salts; and from 20 to 75 wt % water; and (b) a package encasing the detergent formulation, wherein the package comprises a water soluble film as described above.

Preferably, the detergent formulation comprises at least 17 wt % surfactants, preferably at least 20 wt %, preferably at least 23 wt %, preferably at least 26 wt %; preferably no more than 38 wt %, preferably no more than 35 wt %, preferably no more than 32 wt %. Preferably, the detergent formulation comprises at least 43 wt % water, preferably at least 46 wt %, preferably at least 49 wt %, preferably at least 52 wt %, preferably at least 55 wt %; preferably no more than 72 wt %, preferably no more than 69 wt %, preferably no more than 66 wt %. Preferably, the detergent formulation comprises at least 4 wt % of salts; preferably at least 5 wt %, preferably at least 7 wt %, preferably at least 9 wt %; preferably at least 10 weight percent; preferably no more than 20 wt %, preferably no more than 17 wt %, preferably no more than 15 wt %, preferably no more than 13 wt %. The amount of salts does not include any anionic or cationic surfactants present in the detergent. Preferably, salts have no more than ten carbon atoms, preferably no more than six carbon atoms, preferably no more than three carbon atoms. Preferably, salts are selected from the group consisting of chlorides, citrates, phosphates, sulfates, carbonates, metasilicates and aluminosilicates. Preferably, the cations of the salts are alkali metal ions or ammonium ions. Preferably, the detergent comprises a salt which is selected from the group consisting of sodium chloride, ammonium chloride and ammonium sulfate; preferably sodium chloride or ammonium chloride. In some embodiments, 0.5 wt % to 2 wt % of a divalent inorganic salt, such as magnesium sulfate, may be included, for instance as a mixture with the foregoing salts.

The surfactant(s) may be cationic, anionic, nonionic, fatty acid metal salt, zwitterionic or betaine surfactants. Preferably, the detergent formulation comprises at least one anionic surfactant, preferably at least two. Preferably, nonionic surfactants have an alkyl group having at least eight carbon atoms and at least five polymerized ethylene oxide or propylene oxide residues. Preferably, nonionic surfactants have at least five polymerized ethylene oxide residues, preferably at least six, preferably at least seven; preferably no more than twelve, preferably no more than eleven, preferably no more than ten. Preferably, the detergent formulation comprises at least 5 wt % linear alcohol ethoxylates, preferably at least 6 wt %, preferably at least 8 wt %; preferably no more than 15 wt %, preferably no more than 13 wt %, preferably no more than 11 wt %. Preferably, a linear alcohol ethoxylate has a $C_8$-$C_{18}$ alkyl group, preferably $C_{10}$-$C_{16}$, preferably $C_{12}$-$C_{15}$. Preferably, a linear alcohol ethoxylate contains from six to twelve polymerized units of ethylene oxide, preferably from seven to ten. Preferably, anionic surfactants have an alkyl group having at least ten carbon atoms and an anionic group. Anionic surfactants also may have polymerized residues of ethylene oxide, and/or may have aromatic rings.

Preferably, the pH of the detergent formulation is from 4.5 to 11, more preferably from 7 to 10. Suitable bases to adjust the pH of the formulation include mineral bases such as sodium hydroxide and potassium hydroxide; ammonium hydroxide; and organic bases such as mono-, di- or triethanolamine; or 2-dimethylamino-2-methyl-1-propanol (DMAMP). Mixtures of bases may be used.

As indicated above, the water soluble film of the detergent packet is stable in the presence of high ionic strength detergents (containing salts in amounts as described above). In use, the detergent contents of the packet may be released by exposing the packet to low ionic strength water (e.g., containing less than 3 wt % salts), for instance as may be encountered during the wash cycle of a laundry machine.

Following such exposure, the water soluble film will readily disintegrate, releasing the detergent formulation into the surroundings.

Some embodiments of the invention will now be described in detail in the following Examples.

EXAMPLES

General.

Materials used in the following examples include those listed in Table 1.

TABLE 1

| | | |
|---|---|---|
| NaOH | (Sodium hydroxide) Neutralizer | Sigma Aldrich, St. Louis, MO |
| KOH | (Potassium hydroxide) Neutralizer | Sigma Aldrich, St. Louis, MO |
| AMP-95 | (2-amino-2-methyl-1-propanol), neutralizer | The Dow Chemical Company, Midland, MI |
| Benzoflex 2088 | (Benzoate esters), Plasticizer | Eastman Chemical Company, Kingsport, Tennessee |
| Benzoflex 131 | (Benzoic acid, C9-11 branched alkyl esters) Plasticizer | Eastman Chemical Company, Kingsport, Tennessee |
| Dowanol DPM | (Dipropylene glycol methyl ether), Film forming aid | The Dow Chemical Company, Midland, MI |
| UCON LB-65 | Film forming aid | The Dow Chemical Company, Midland, MI |
| n-DDM | n-dodecyl mercaptan, Chain transfer agent | Sigma Aldrich, St. Louis, MO |
| Snowtack ™ 780G | (Rosin ester), Tackifier | Lawter, Chicago, IL 60601 USA |
| SMA.NaOH | Poly(styrene-alt-maleic acid) sodium salt solution | Sigma Aldrich, St. Louis, MO |

Polymer Synthesis

Polymers 1-4 from the following examples may be prepared by emulsion polymerizing the constituent monomers to obtain a latex composition having 40-44% solids. The monomer abbreviations in Table 2 are used in giving polymer composition:

TABLE 2

| | |
|---|---|
| AA | (Acrylic acid), Monomer |
| BA | (Butyl acrylate), Monomer |
| EA | (Ethyl acrylate), Monomer |
| HEMA | (2-hydroxy ethyl methacrylate), Monomer |
| MMA | (Methyl methacrylate), Monomer |
| MAA | (Methacrylic acid), Monomer |

Synthesis of Polymer 1. A monomer emulsion mixture is made containing 375 g deionized water, 18 g of RHODA-FAC™ RS-610 (23%) (an anionic surfactant from Solvay), 164 g BA, 409 g MMA, 122 g HEMA, 122 g MAA and 8.2 g of n-DDM. After heating a reaction vessel containing 572 ml deionized water and 10.9 g RS-610 to 85° C. (under nitrogen), 6.7% of the above monomer mixture with a 5 g water rinse is and then followed by addition of 1 g ammonium persulfate (APS) in 15 g of water. This combination is held at 85° C. for 5 minutes. Then, the remaining monomer mixture is added over a period of 60 minutes along with a cofeed of 0.6 g APS (ammonium persulfate, an initiator) and 42 g water. After all co-feeds are completed, a 50 g rinse is added and the vessel is held at 85° C. for 15 minutes and then cooled to 80° C., followed by one or more chase (addition of initiator followed by a hold period at 80° C.). The product is cooled and filtered to give a polymer emulsion with about 40% solids. After polymerization, the above salt-sensitive emulsion polymers are diluted to a solids content of 20%. The water-solubilized polymer composition is then prepared at room temperature by neutralizing the emulsion polymer according to the following procedure: the emulsion composition is agitated and an aqueous solution of 15% solids of a neutralizer, an organic or inorganic base, is added until the desired degree of neutralization is achieved. Unless context indicates otherwise, the compositions of the examples below are neutralized at least to the point where they become translucent. Polymer 2-4 are prepared in a similar manner with appropriate substitution of monomers. Polymers 1-4 have the compositions and properties shown in Table 3. Monomer amounts are in wt %. Polymers 1-3 are soft polymers, whereas Polymer 4 is a hard polymer.

TABLE 3

Composition and properties inventive water soluble films

| | Polymer 1 | Polymer 2 | Polymer 3 | Polymer 4 |
|---|---|---|---|---|
| AA | 0 | 0 | 0 | 0 |
| BA | 20 | 15 | 25 | 25 |
| EA | 50 | 25 | 25 | |
| 2-EHA | 0 | 25 | 25 | 10 |
| HEMA | 15 | 15 | 0 | |
| MMA | | | | 47 |
| MAA | 15 | 20 | 25 | 18 |
| Total | 100 | 100 | 100 | 100 |
| Tg | 14 | 19 | 29 | 81 |
| Acid Number | 1.74 | 2.47 | 2.99 | 2.30 |
| Solids (wt %) | 40-44 | 40-44 | 40-44 | 40-44 |

Test Methods:

Aqueous Film Casting. 15-25 grams of the composition is cast on a PET substrate using a stainless steel draw down bar to provide a dried film with a target thickness of 76 μm. The plates are immediately transferred to a forced air oven and dried at 65-80 degrees Celsius for 10-15 minutes. The glass plates supporting the dried film are allowed to equilibrate at room temperature for several hours after film drying.

Cold Water Solubility Testing. Thin film strips measuring 0.5 inch wide and 1.5 inch long were placed in 20 ml of tap water. The films were allowed to sit undisturbed for approximately 2 mins and then shaken for 60 seconds by hand. The dissolved/dispersed film mixture was then filtered using a 25 um mesh screen. The following rating scale based on residue on the 0.025 mm mesh screen was then used to characterized the overall cold water solubility:

5=Clear solution, no residue
    4=Cloudy solution or dispersion, no residue
    3=fine grit
    2=large amt of grit/residue
    1=Film fragment
    0=Intact/did not break Examples 1-9: Preparation of Water-Soluble Films with Improved Mechanical and High Water Detergent Resistance Table 4 lists the formulation details for Examples 1-11 which are water-soluble films of the invention, prepared using Polymers 1 to 4 and formulated to include various plasticizers and additives to improve the mechanical properties of the films. Table 5 lists the properties of the films, including when used with detergents.

Table 5 shows that all of the tested films exhibited favorable cold water solubility. All of the films also exhibited detergent resistance at pH 4.5 in the presence of 10 percent salt and 53% water. However, the films were observed to lose solubility or re-dispersibility after exposure to the low pH formulation. Examples 7, 8, and 9 showed detergent resistance at higher pH of 7.6 and were re-dispersible after exposure to the detergent Examples 7, 8, and 9 were therefore found to provide a favorable combination of good cold water-solubility and high water and salt detergent resistance.

What is claimed is:

1. A water soluble film, comprising:
(A) an acrylic polymer blend comprising:
(a) a hard polymer with a glass transition temperature ("Tg") from 60° C. to 130° C. and comprising polymerized units derived from: (i) 50 to 90 wt % of at least one (C1-C10)alkyl (meth)acrylate; (ii) 10 to 50 wt % of at least one C3-C8 monoethylenically unsaturated monocarboxylic acid monomer or ethylenically unsaturated dicarboxylic acid monomer; and (iii) zero to 25 wt % of least one hydroxyalkyl (meth)acrylate, based on the total weight of the hard polymer; and
(b) a soft polymer with a Tg from minus 20° C. to 40° C. and comprising polymerized units derived from: (i) 50 to 90 wt % of at least one (C1-C10)alkyl (meth)acrylate; (ii) 10 to 50 wt % of at least one C3-C8 monoethylenically unsaturated monocarboxylic acid monomer or ethylenically unsaturated dicarboxylic acid monomer; and (iii) zero to 25 wt % of least one hydroxyalkyl (meth)acrylate, based on the total weight of the soft polymer,

TABLE 4

| Example | 1 | 2 | 3 | 4 | 5 | 6 | 7 | 8 | 9 |
|---|---|---|---|---|---|---|---|---|---|
| g Polymer 1 | 34% | 31% | 27% | 26% | | | 24% | 25% | 25% |
| g Polymer 2 | | | | | 23% | | | | |
| g Polymer 3 | | | | | | 22.7% | | | |
| g Polymer 4 | 51% | 46% | 65% | 63% | 59% | 59.0% | 55% | 58% | 57% |
| SMA.NaOH | | 12% | | | | | | | |
| Tackifier-Snowtack 780G | | | | | | | 4% | | |
| Neutralizer.KOH | | | | | Yes | Yes | | | |
| Neutralizer.NaOH | Yes | Yes | Yes | Yes | | | Yes | Yes | Yes |
| Benzoflex 131 | 10% | 6.5% | 4.4% | 4% | 10% | 11.1% | 4.1% | 4.1% | 4.13% |
| Glycerol | 6% | 5.2% | 4.2% | 4% | 7.9% | 7.3% | 3.3% | 3.3% | 3.38% |
| Fumed Silica-Cab-O-Sil ™ M5 | | | | 2% | | | 9.4% | 9.2% | 9.86% |
| Crosslinker - CaCl₂ | | | | | | | | | 0.56% |
| Crosslinker - ZnO | | | | | | | 0.32% | 0.33% | |
| Total | 100% | 100% | 100% | 100% | 100% | 100% | 100% | 100% | 100% |

TABLE 5

Properties of water-soluble films with improved mechanical and detergent resistance

| Example | 1 | 2 | 3 | 4 | 5 | 6 | 7 | 8 | 9 |
|---|---|---|---|---|---|---|---|---|---|
| Water Solubility | 5 | 5 | 5 | 4 | 4 | 4 | 4 | 4 | 4 |
| Detergent A1 Resistance pH 4.5 | Pass | Pass | Pass | Pass | Pass | Pass | Pass | Pass | Pass |
| Detergent A2 Resistance pH 7.6 | Fail | Fail | Fail | Fail | Fail | Fail | Pass | Pass | Pass |
| Re-dispersibility after pH 4.5 | 1 | 1 | 1 | 1 | 1 | 1 | 2 | 2 | 2 |
| Re-dispersibility after pH 7.6 | N/A | N/A | N/A | N/A | N/A | N/A | 4 | 4 | 4 |

Detergent formulation A1 contained 19.5% ALPHA-STEP PC-48 (an anionic surfactant from Stepan Co.), 9.5% BIO-SOFT N25-7 (a nonionic surfactant from Stepan Co.), and 6.5% STEOL CS-270 (alcohol ethoxylate sulfate), 10% sodium chloride and approximately 53% water. The pH is 4.5
Detergent formulation A2 contained 19.5% ALPHA-STEP PC-48, 9.5% BIO-SOFT N25-7, and 6.5% STEOL CS-270 (alcohol ethoxylate sulfate), 10% sodium chloride, 1% magnesium sulfate and approximately 52% water. The pH was adjusted with sodium hydroxide to 7.6 wherein the difference in the Tgs of the hard polymer and the soft polymer is 40° C. or more, and wherein at least a portion of the carboxylic acid groups on the hard polymer or the soft polymer, or both the hard polymer and the soft polymer, are neutralized; and
(B) a plasticizer; and
(C) an ionic crosslinker.

2. The water soluble film of claim 1, wherein the ionic crosslinker is a bivalent metal cation.

3. The water soluble film of claim 1, further comprising one or more of a tackifier, a filler, or a coalescent.

4. The water soluble film of claim 1, wherein the hard polymer comprises polymerized units derived from: (i) 50 to 90 of at least one (C1-C3)alkyl methacrylate and at least one (C2-C8)alkyl acrylate; and (ii) 10 to 50 wt % of at least one C3-C8 monoethylenically unsaturated monocarboxylic acid monomer or ethylenically unsaturated dicarboxylic acid monomer, based on the total weight of the hard polymer.

5. The water soluble film of claim 1, wherein the soft polymer comprises polymerized unites derived from: (i) 50 to 90 wt % of at least one (C2-C8)alkyl (meth)acrylate; (ii) 10 to 50 wt % of at least one C3-C8 monoethylenically unsaturated monocarboxylic acid monomer or ethylenically unsaturated dicarboxylic acid monomer; and (iii) zero to 25 wt % of least one hydroxyalkyl (meth)acrylate, based on the total weight of the soft polymer.

6. The water soluble film of claim 1, wherein the plasticizer is a blend of a hydrophobic material and a hydrophilic material.

7. A detergent packet comprising:
(a) a detergent formulation comprising from 14 to 40 wt % surfactants; from 3 to 25 wt % salts; and from 20 to 75 wt % water; and
(b) a package encasing the detergent formulation, wherein the package comprises the water soluble film of claim 1.

8. The detergent packet of claim 7, wherein the salts are selected from the group consisting of chlorides, citrates, phosphates, sulfates, carbonates, metasilicates, aluminosilicates, and mixtures of two or more thereof.

* * * * *